(12) United States Patent
Hutchinson et al.

(10) Patent No.: US 7,862,117 B2
(45) Date of Patent: Jan. 4, 2011

(54) HEAD REST AND HARNESS ADJUSTMENT FOR CHILD CAR SEAT

(75) Inventors: James M. F. Hutchinson, Mohnton, PA (US); Robert E. Haut, West Chester, PA (US)

(73) Assignee: Wonderland Nurserygoods Co., Ltd, Taipei (TW)

( * ) Notice: Subject to any disclaimer, the term of this patent is extended or adjusted under 35 U.S.C. 154(b) by 0 days.

(21) Appl. No.: 11/953,063

(22) Filed: Dec. 9, 2007

(65) Prior Publication Data

US 2008/0136232 A1 Jun. 12, 2008

Related U.S. Application Data

(60) Provisional application No. 60/874,392, filed on Dec. 12, 2006.

(51) Int. Cl.
*B60N 2/28* (2006.01)

(52) U.S. Cl. .................. 297/256.1; 297/250.1; 297/410

(58) Field of Classification Search ............ 297/256.11, 297/256.1, 410, 253, 250.1
See application file for complete search history.

(56) References Cited

U.S. PATENT DOCUMENTS

| | | | | |
|---|---|---|---|---|
| 4,754,999 | A | 7/1988 | Kain | 297/250 |
| 4,790,601 | A * | 12/1988 | Burleigh et al. | 297/484 |
| 4,858,997 | A | 8/1989 | Shubin | 297/487 |
| 5,125,686 | A * | 6/1992 | Yano et al. | 280/801.2 |
| 6,030,047 | A | 2/2000 | Kain | 297/484 |
| 6,135,553 | A | 10/2000 | Lovie | 297/250.1 |
| 6,155,638 | A | 12/2000 | Bapst | 297/250.1 |
| 6,189,970 | B1 | 2/2001 | Rosko | 297/250.1 |
| 6,273,509 | B1 * | 8/2001 | Reithmeier et al. | 297/410 |
| 6,398,302 | B1 | 6/2002 | Freedman | 297/250.1 |
| 6,491,348 | B1 | 12/2002 | Kain | 297/484 |
| 6,623,074 | B2 | 9/2003 | Asbach | 297/250.1 |
| 6,626,493 | B2 | 9/2003 | Kain | 297/250.1 |
| 6,682,143 | B2 | 1/2004 | Amirault | 297/250.1 |
| 6,688,685 | B2 | 2/2004 | Kain | 297/250.1 |
| 6,695,412 | B2 * | 2/2004 | Barger et al. | 297/484 |
| 6,779,843 | B2 | 8/2004 | Kain | 297/250.1 |
| 7,021,710 | B2 | 4/2006 | Kain | 297/256.11 |

(Continued)

FOREIGN PATENT DOCUMENTS

DE     10107874     9/2002

(Continued)

*Primary Examiner*—Peter R. Brown
(74) *Attorney, Agent, or Firm*—Miller Law Group, PLLC

(57) ABSTRACT

A car seat includes a vertically adjustable head rest and harness support apparatus that will properly locate the position of the harness relative to the child in response to the positioning of the head rest. The head rest is movable along a curved track to provide horizontal clearance with respect to the vehicle head rest when in a fully raised position. The harness belt is trapped in a length adjustment lock and follows a path that extends around a fixed guide bar at the top of the car seat frame then downwardly through a guide member that directs the belt through an opening in the seat back for engagement with the child. The guide member is supported on a harness control tube that engages a rack device to fix the position of the harness control tube when the position of the head rest is selected.

16 Claims, 17 Drawing Sheets

U.S. PATENT DOCUMENTS

| | | | |
|---|---|---|---|
| 7,048,336 B2* | 5/2006 | Mawbey et al. | 297/408 |
| 7,055,903 B2* | 6/2006 | Balensiefer et al. | 297/256.11 |
| 7,195,314 B2* | 3/2007 | Spence et al. | 297/250.1 |
| 7,232,185 B2* | 6/2007 | Hartenstine et al. | 297/250.1 |
| 7,246,852 B2* | 7/2007 | Balensiefer | 297/250.1 |
| 7,246,854 B2* | 7/2007 | Dingman et al. | 297/250.1 |
| 7,306,284 B2* | 12/2007 | Horton et al. | 297/250.1 |
| 7,370,912 B2* | 5/2008 | Williams et al. | 297/256.11 |
| 7,452,031 B2* | 11/2008 | Woellert et al. | 297/250.1 |
| 7,547,065 B2* | 6/2009 | Barger | 297/250.1 |
| 2002/0145318 A1* | 10/2002 | Asbach et al. | 297/250.1 |
| 2003/0151282 A1* | 8/2003 | Williams et al. | 297/250.1 |
| 2003/0193225 A1* | 10/2003 | Kain | 297/250.1 |
| 2004/0124676 A1* | 7/2004 | Kain | 297/250.1 |
| 2004/0124678 A1* | 7/2004 | Williams et al. | 297/256.11 |
| 2004/0245821 A1* | 12/2004 | Chen | 297/250.1 |
| 2005/0173956 A1* | 8/2005 | Balensiefer et al. | 297/256.11 |
| 2005/0189806 A1* | 9/2005 | Hall et al. | 297/256.11 |
| 2005/0200177 A1 | 9/2005 | Balensiefer | 297/250.1 |
| 2005/0212342 A1* | 9/2005 | Kain et al. | 297/410 |
| 2005/0225136 A1 | 10/2005 | Horton | 297/250.1 |
| 2006/0220427 A1* | 10/2006 | Patrizi et al. | 297/250.1 |
| 2007/0040428 A1* | 2/2007 | Sakumoto | 297/250.1 |
| 2007/0057545 A1* | 3/2007 | Hartenstine et al. | 297/250.1 |
| 2007/0120403 A1* | 5/2007 | Drexler | 297/250.1 |
| 2007/0284925 A1* | 12/2007 | Balensiefer | 297/256.11 |

FOREIGN PATENT DOCUMENTS

| | | |
|---|---|---|
| EP | 1084900 | 3/2001 |
| EP | 1695865 | 8/2006 |
| JP | 2008636 | 1/1990 |
| WO | 20060015428 | 2/2006 |

\* cited by examiner

Fig. 2
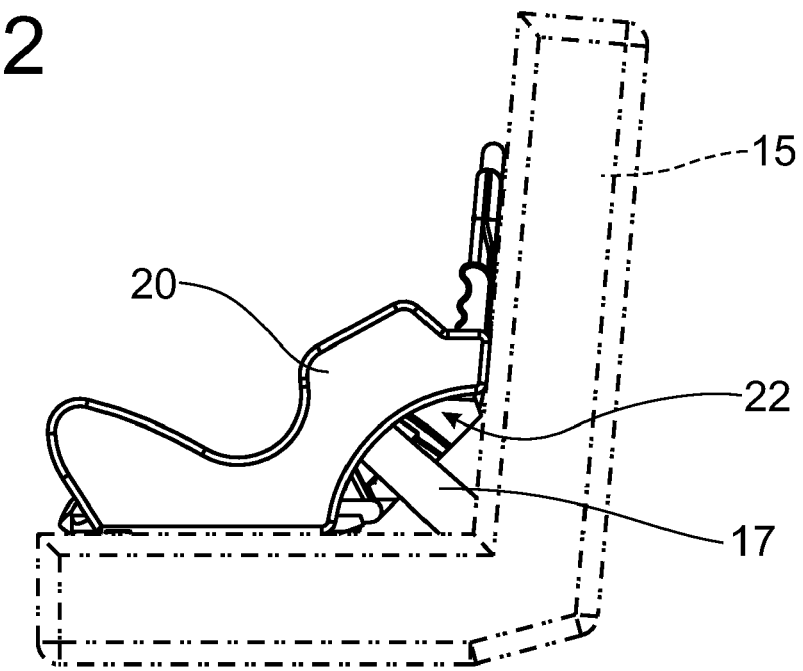
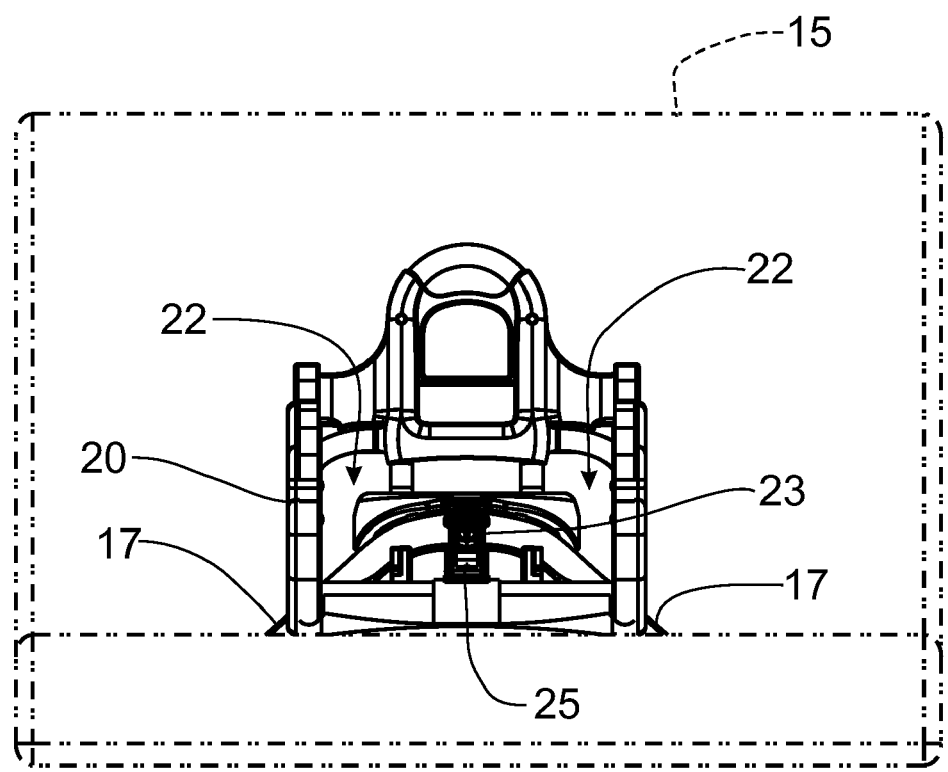
Fig. 3

Fig. 5
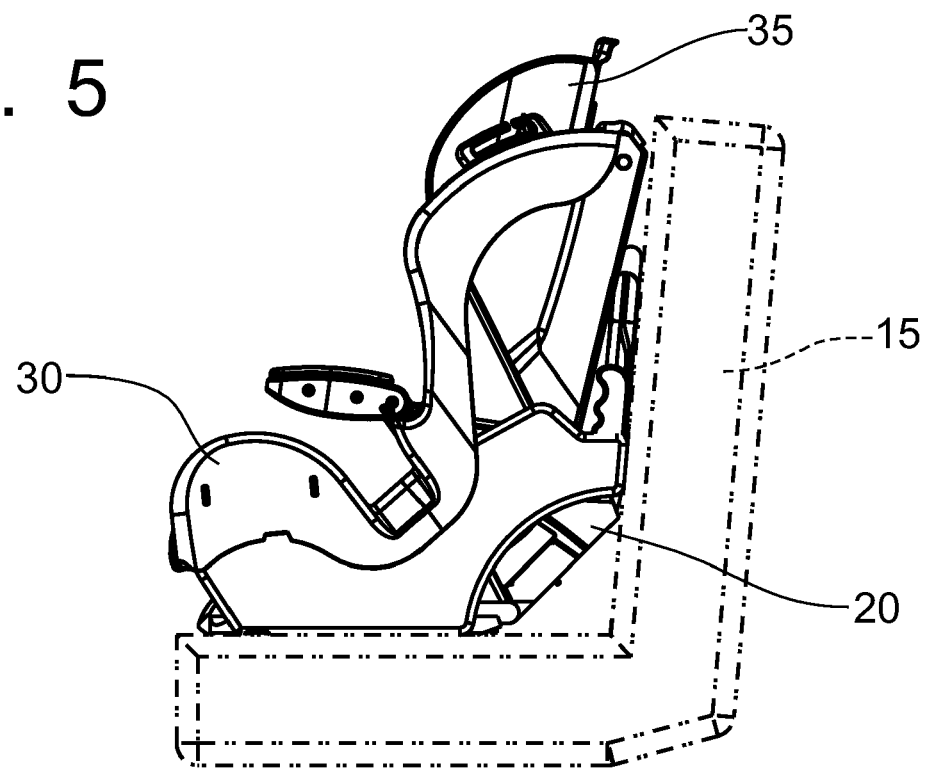
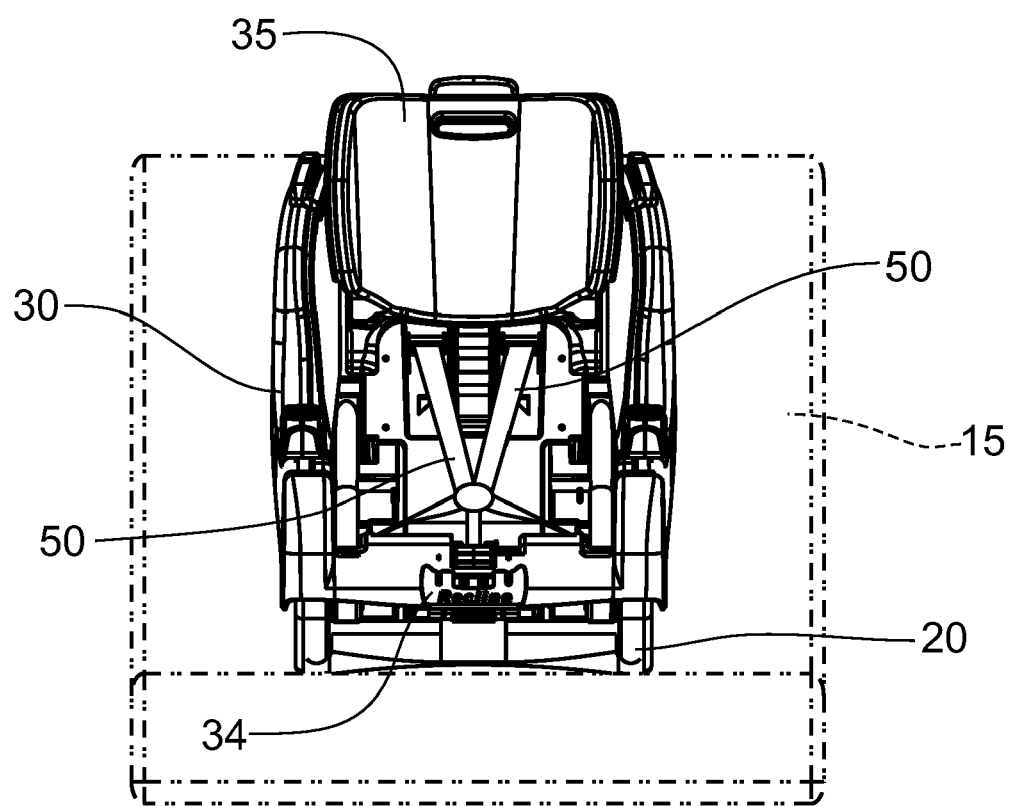
Fig. 6

Fig. 7
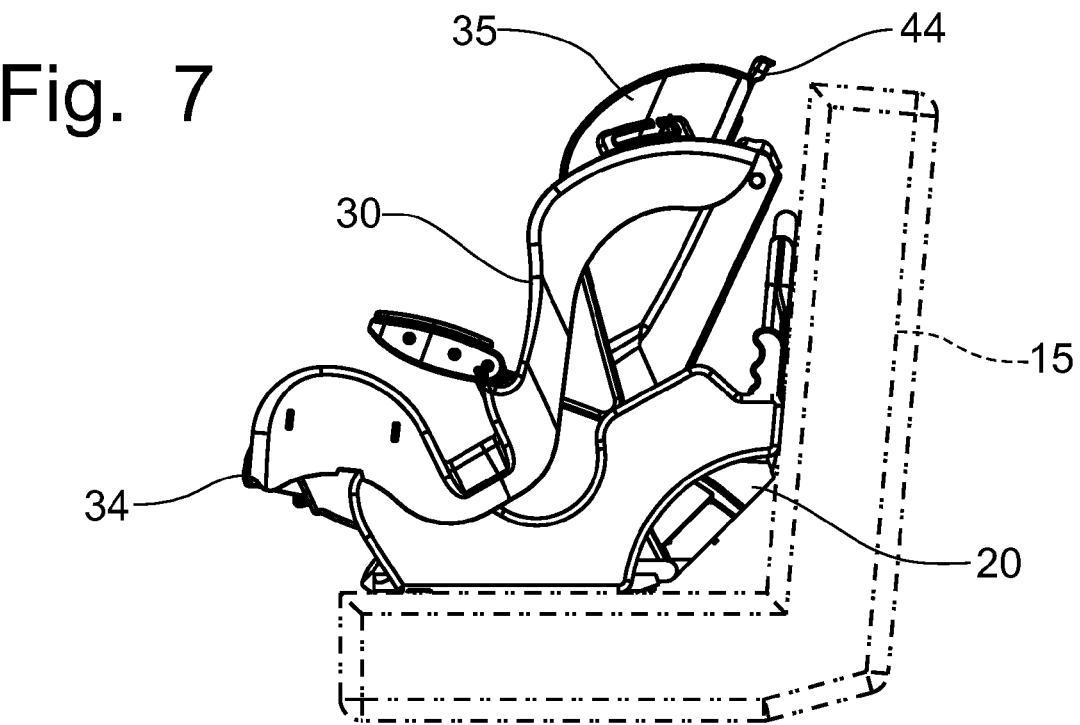
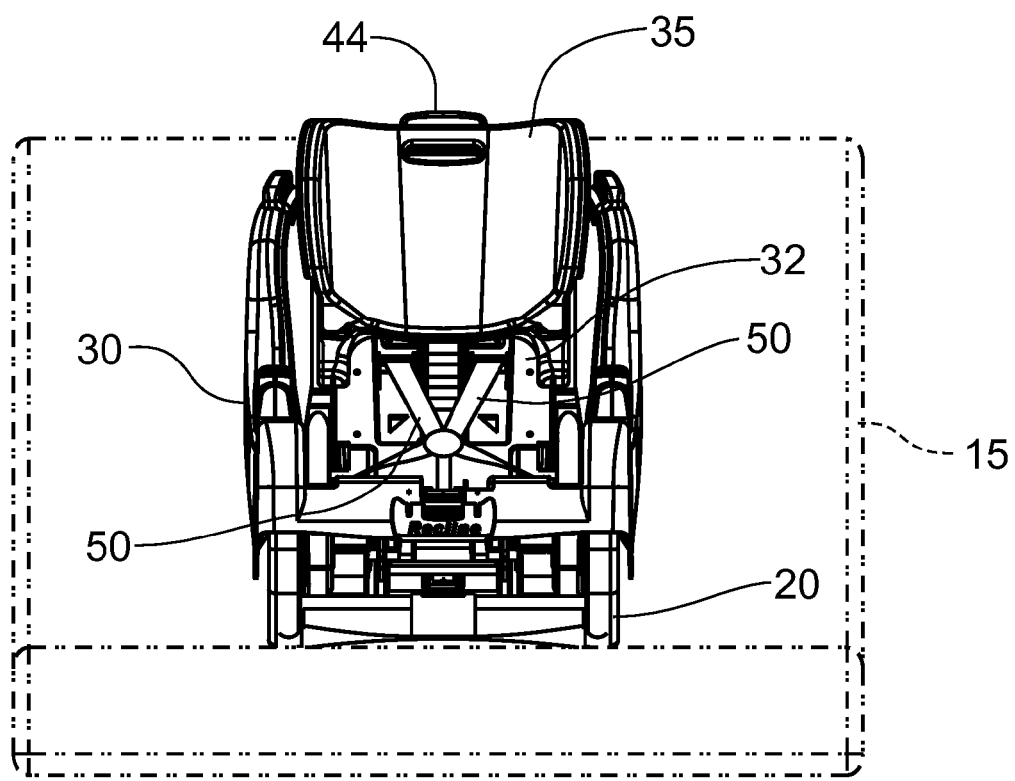
Fig. 8

HEAD REST AND HARNESS ADJUSTMENT FOR CHILD CAR SEAT

CROSS-REFERENCE TO RELATED APPLICATIONS

This application claims domestic priority on U.S. Provisional Patent Application Ser. No. 60/874,392, filed on Dec. 12, 2006, the contents of which are incorporated herein by reference.

FIELD OF THE INVENTION

The present invention relates generally to a car seat for use in transporting children in an automobile, and, more particularly, to a shoulder harness and head rest adjustment apparatus that can be adjusted without causing a substantial change in the length of the shoulder harness belt.

BACKGROUND OF THE INVENTION

Car safety seats for children are commercially available in a many configurations corresponding to differences in the age, weight, and size of the child being transported. Parents can choose a car seat that is not only the correct size for their child and their vehicle, but one that also suits their tastes, budget, and life style. As children grow in size and maturity level, they need different kinds of car seats. For example, a child may initially use a rearwardly facing infant car seat, then graduate to a forward facing toddler seat with an integrated harness, and finally to a belt positioning booster seat utilizing the vehicle's lap and shoulder belt system before being able to safely use the vehicle's seat belts alone.

There are many car seats on the market that can be used in multiple configurations. For instance, a forward facing car seat with an integral harness appropriate for a 20-40 pound child might accommodate a child weighing 30-100 pounds as a belt positioning booster seat with the removal of the harness and utilizing the vehicle's lap and shoulder belts. This is convenient for the care giver because it means fewer seats to purchase. Some parents choose to buy a belt positioning booster seat for their older child. Such a booster seat may be configured with a high back, such as is disclosed in U.S. Pat. No. 6,682,143, granted to Davis Amirault on Jan. 27, 2004, or can have no back at all. Older children who don't want to be seen sitting in a "baby seat" like this option and parents don't have to manage a big bulky car seat.

Currently available car seats typically have a monolithic shell, i.e. the back and seat cannot be used separately. Some car seats are designed to have a no back base option, but are configured as a separate seat fastened under the monolithic seat and back, such as is disclosed in U.S. Pat. No. 4,754,999, issued on Jul. 5, 1998, to James Kain. The problem with this configuration is the redundancy of seats; one as part of the monolithic shell, and one as a seat only.

States review and regulate restraint age limits and weight requirements. With continuing age and weight increases for recommendations in child restraint safety, a variety of restraint sizes are needed to accommodate the increasing span of children needing car seat safety restraints. The shoulder height and proper placement of belt paths are critical to the safety function of car seat restraints. As the child grows the headrest area needs to accommodate their body size and move up as they grow. Some seats are used for more than one child and the head rest area needs to move up and down to fit properly with each child. Purchasing new seats as the child grows is a costly alternative. Some seats on the market have up and down head rest adjustment but they are not always obvious or easy to operate. One example of a car seat having an adjustable head rest can be found in U.S. Pat. No. 6,623,074, granted to Ronald Asbach on Sep. 23, 2003, wherein the head rest is vertically movable on the seat back with the harness straps passing through the head rest to be adjustable therewith. Another example can be found in U.S. Patent Application Publication No. 2005/0225136, filed by William Horton and published on Oct. 13, 2005, in which the head rest is vertically adjustable relative to the seat back.

In these prior art devices, the overall length of the harness belt changes with the positional adjustment of the head rest and the appropriate relocating of the harness belt path to match the adjusted position of the head rest. To accommodate the changes in harness belt length, the car seat is provided with a belt length adjustment mechanism, usually located at the lower front portion of the car seat apparatus. Each time the position of the head rest is adjusted, the belt length adjustment needs to be manipulated to correct the length of the harness belt for proper fit of the harness on the child.

The movement of the head rest relative to the seat back or the bottom of the seat is accomplished in each of the different structural configurations within the above-identified prior art car seats though a linearly shape track. As the head rest is moved from a lowermost position to the highest position, the top portion of the head rest simply extends linearly away from the bottom of the car seat. When the seat is reclined, the head rest, of course, tips rearwardly, assuming that the car seat is placed into a forward facing orientation. This structural configuration can result in an interference between the top portion of the head rest and top of the vehicle seat, or the vehicle head rest at the top of the vehicle seat. Accordingly, it would be desirable to provide a head rest adjustment mechanism that would be operable to provide an improved clearance between the top of the car seat head rest and the top portions of the vehicle seat when the seat is reclined and the head rest is positionally elevated.

It would also be desirable to provide a harness support apparatus cooperable with an adjustable head rest for a car seat so that the overall length of the harness belt remains unchanged irrespective of the position at which the head rest is adjusted.

SUMMARY OF THE INVENTION

It is an object of this invention to provide a car seat for transporting children in an automobile that has a positionally adjustable head rest cooperable with a movable harness that relocates in response to the positional adjustment of the head rest.

It is another object of this invention to provide a support apparatus for the harness that will move in conjunction with the movement of the head rest on a child's car seat so that the overall length of the harness belt does not require substantial adjustment when the head rest is re-positioned.

It is a feature of this invention that the harness belt passes through a guide member that directs the path of the belt from behind the seat back through an opening in the seat back to engage the child in the car seat.

It is an advantage of this invention that the guide member is located relative to the head rest to correspond to being at the shoulder of the child seated in the car seat when the head rest is properly positioned.

It is another feature of this invention that the harness belt passes over a fixed guide bar located at the top of the seat frame so that the length of the harness belt does not effectively vary when the guide members are relocated with the positioning of the head rest.

It is another advantage of this invention that the vertically positionable head rest and harness will adjust positionally to the size of the child being transported on the car seat.

It is still another advantage of this invention that the fixed guide bar can be designed to increase the resistance of the harness to restrain a child during crash events.

It is still another object of this invention to provide a head rest for a car seat that moves generally vertically relative to the seat back of the car seat along a curved track.

It is still another feature of this invention that the arcuate track of movement for the head rest moves the head rest inwardly as the head rest moves upwardly.

It is yet another advantage of this invention that the curved back surface for the movement of the head rest creates a more vertical seat back angle for the older children being seated in a properly positioned car seat.

It is yet another feature of this invention that the curved track for the movement of the head rest is concave from the aspect of child seating on the car seat.

It is a further advantage of this invention that the curved track for the positional adjustment of the head rest reduces the possibility of interference between a raised head rest and the top portion of the vehicle seat on which the car seat is located.

It is still another feature of this invention that the curved track seat back surface on which the head rest moves vertically provides a more reclined back angle for a small child, while providing a more upright back angle for an older child.

It is yet another object of this invention to provide an adjustable head rest and harness apparatus for a car seat which is durable in construction, inexpensive of manufacture, care-free of maintenance, facile in assemblage, and simple and effective in use.

These and other objects, features and advantages are accomplished according to the instant invention by providing a car seat having a vertically adjustable head rest and harness support apparatus that will properly locate the position of the harness relative to the child in response to the positioning of the head rest. The head rest is movable along a curved track to provide a more reclined back angle for a small child and a more upright back angle for an older child. The harness belt is trapped in a length adjustment lock and follows a path that extends around a fixed guide bar at the top of the car seat frame then downwardly through a guide member that directs the belt through an opening in the seat back for engagement with the child. The guide member is supported on a harness control tube that engages a rack device to fix the position of the harness control tube when the position of the head rest is selected.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a left side elevational view of the base member shown in FIG. 1, the representative vehicle seat being shown in phantom;

FIG. 3 is a front elevational view of the base member shown in FIG. 1;

FIG. 5 is a left side elevational view of the seat mounted on the base member, as shown in FIG. 4, the representative vehicle seat being shown in phantom;

FIG. 6 is a front elevational view of the seat mounted on the base member, as depicted in FIGS. 4 and 5;

FIG. 7 is a left side elevational view similar to that of FIG. 5, but showing the forward facing seat member in a reclined position relative to the base member;

FIG. 8 is a front elevational view of the reclined seat member shown in FIG. 7, the representative vehicle seat being shown in phantom;

FIG. 19 is an enlarged partial cross-sectional view of the lock mechanism for the head rest with the lock bar depicted in a unlatched orientation while moving between one notch in the control rack to another;

DETAILED DESCRIPTION OF THE PREFERRED EMBODIMENT

Figure 1:
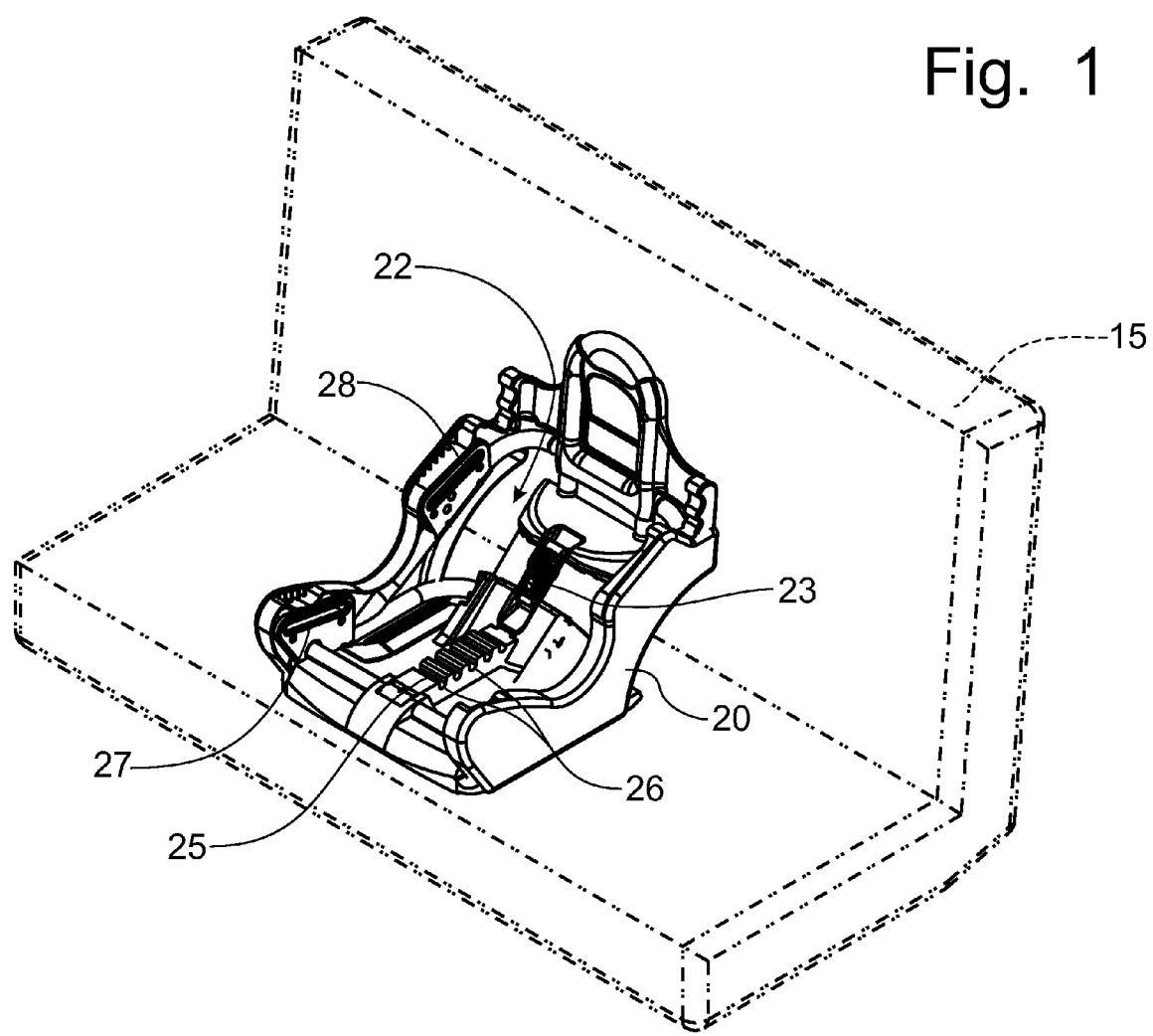
FIG. 1 is an upper, front perspective view of a base member, incorporating the principles of the instant invention, mounted on a representative vehicle seat, shown in phantom.

Referring now to FIGS. 1-8, a car seat incorporating the principles of the instant invention can best be seen. The car seat 10 can be configured in a number of different positions, as will be described in greater detail below, and is formed of a seat member 30 detachably mounted on a base member 20. As is best seen in FIGS. 1-3, the base member 20 is a separate member that is affixed to a vehicle seat 15, representatively shown in phantom, by the seat belt 17 of the vehicle. The vehicle seat belt 17 is pulled through a first side opening 22, across a seat belt latch member 23 and out through the second side opening 22 to be connected to the vehicle seat belt latch member (not shown) and pull tight to capture the base member 20 on the vehicle seat 15. The seat belt latch member 23 secures the vehicle seat belt 17 to the base member 20 and is selectively movable to release the vehicle seat belt 17 from engagement with the base member 20.

The base member is formed with a central rack member 25 having a plurality of parallel, horizontally disposed notches 26 to receive the recline latch apparatus 33, which include a transverse bar 33a that rests in one of the notches 26, on the seat member 30 to change the position of the seat member 30 on the base member 20. The base member is also formed with two pairs of opposing recline control slots 27, 28 into which retractable latch pins 65 are engagable to secure the seat member 30 to the base member 20. The lower recline control slots 27 is positioned at a forward portion of the base member 20 and is oriented generally horizontally. The upper recline control slots 28 are located at a rearward portion of the base member 20, but are oriented at an inclined angle compared to the lower recline control slots 27. As a result, the rearward portion of the seat member 30 will lower as the forward portion of the seat member 30 moves forwardly to create a reclined orientation for the seat member 30. The upright configuration of the seat member 30, corresponding to the latch pins 65 being positioned in the rearwardmost portions of the recline control slots 27, 28, is shown in FIGS. 4-6, while the recline configuration of the seat member 30, corresponding to the latch pins 65 being positioned in the forwardmost portions of the recline control slots 27, 28, is depicted in FIGS. 7 and 8.

Figure 4:
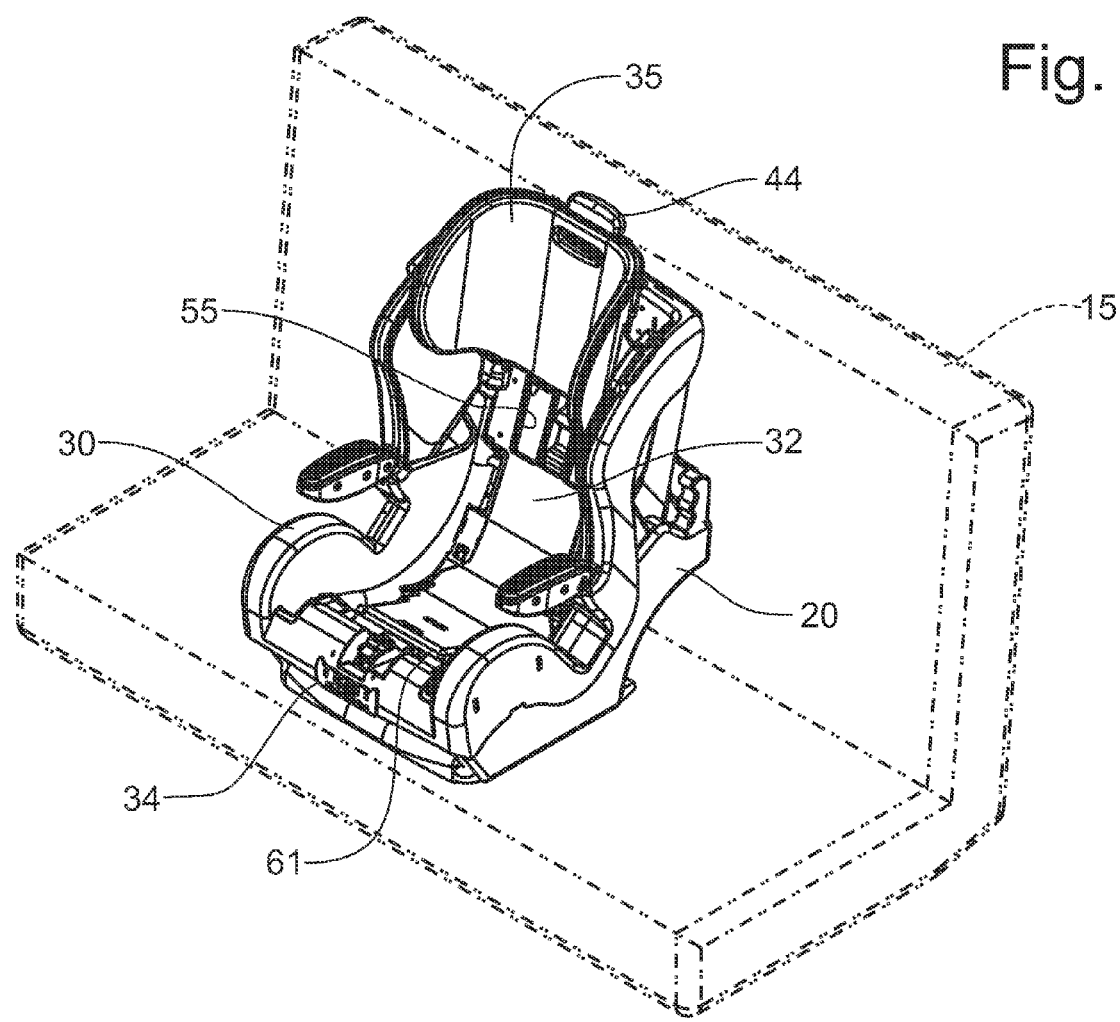
FIG. 4 is an upper, front perspective view, similar to that of FIG. 1, but showing a seat member incorporating the principles of the instant invention mounted on the base member in a forward facing orientation with the seat positioned in a fully upright position, the representative vehicle seat being shown in phantom.
Figure 9:
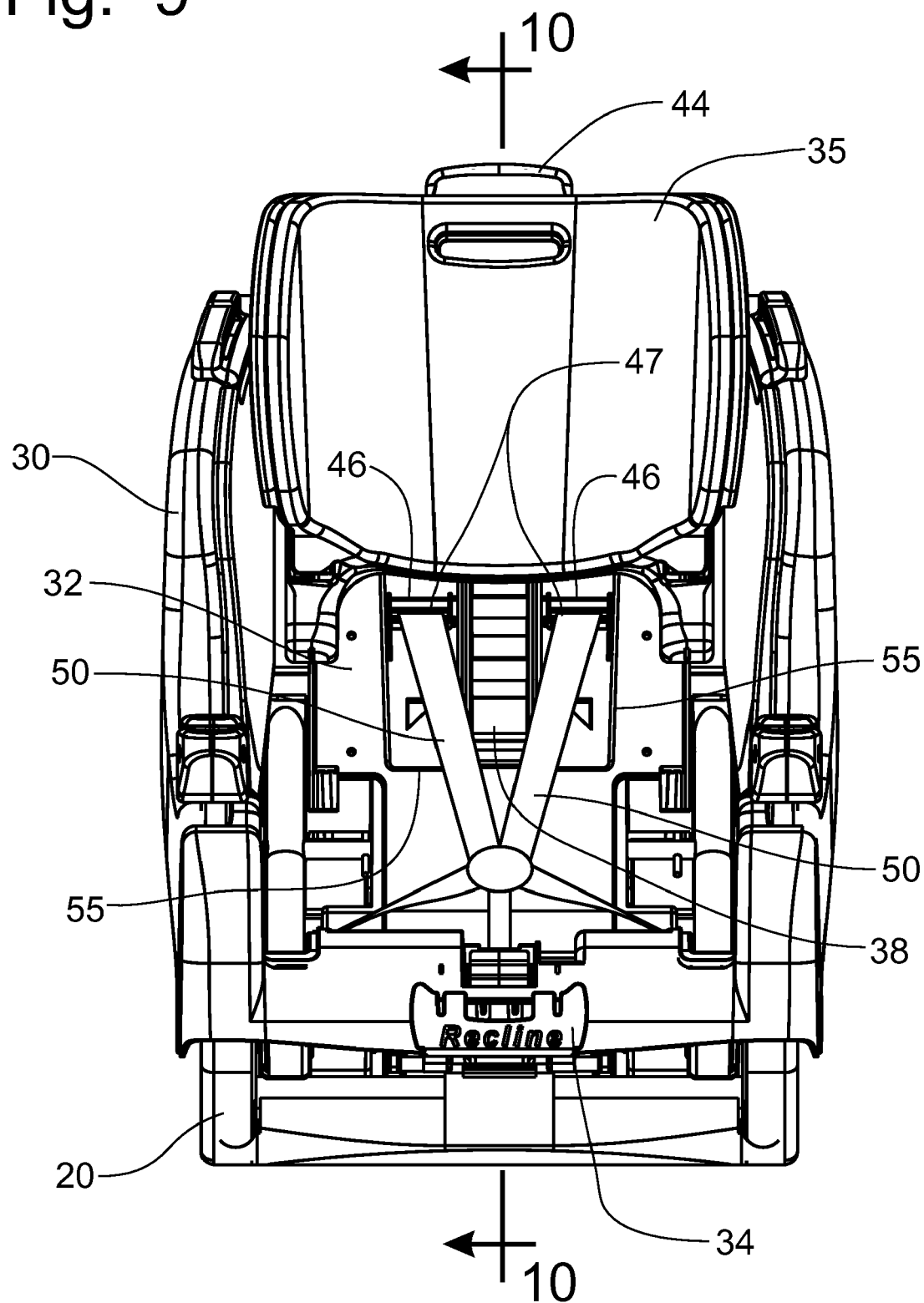
FIG. 9 is an enlarged front elevational view of the car seat incorporating the principles of the instant invention, the head rest being moved into a mid-range raised position.
Figure 10:
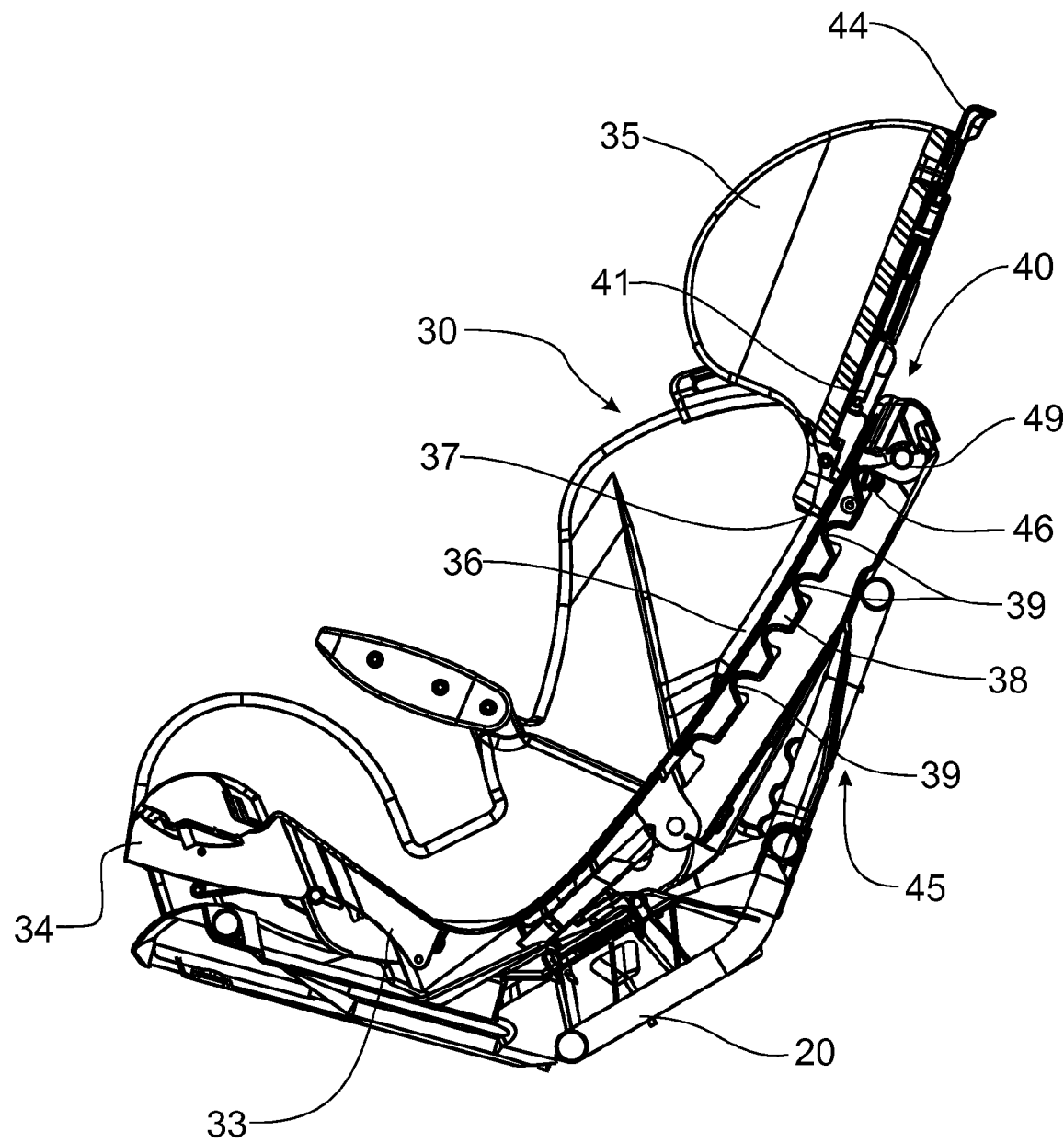
FIG. 10 is a cross-sectional view of the car seat corresponding to lines 10-10 of FIG. 9 to depict the head rest adjustment mechanism and the harness support apparatus incorporating the principles of the instant invention, the head rest being moved to the fully raised position.
Figure 11:
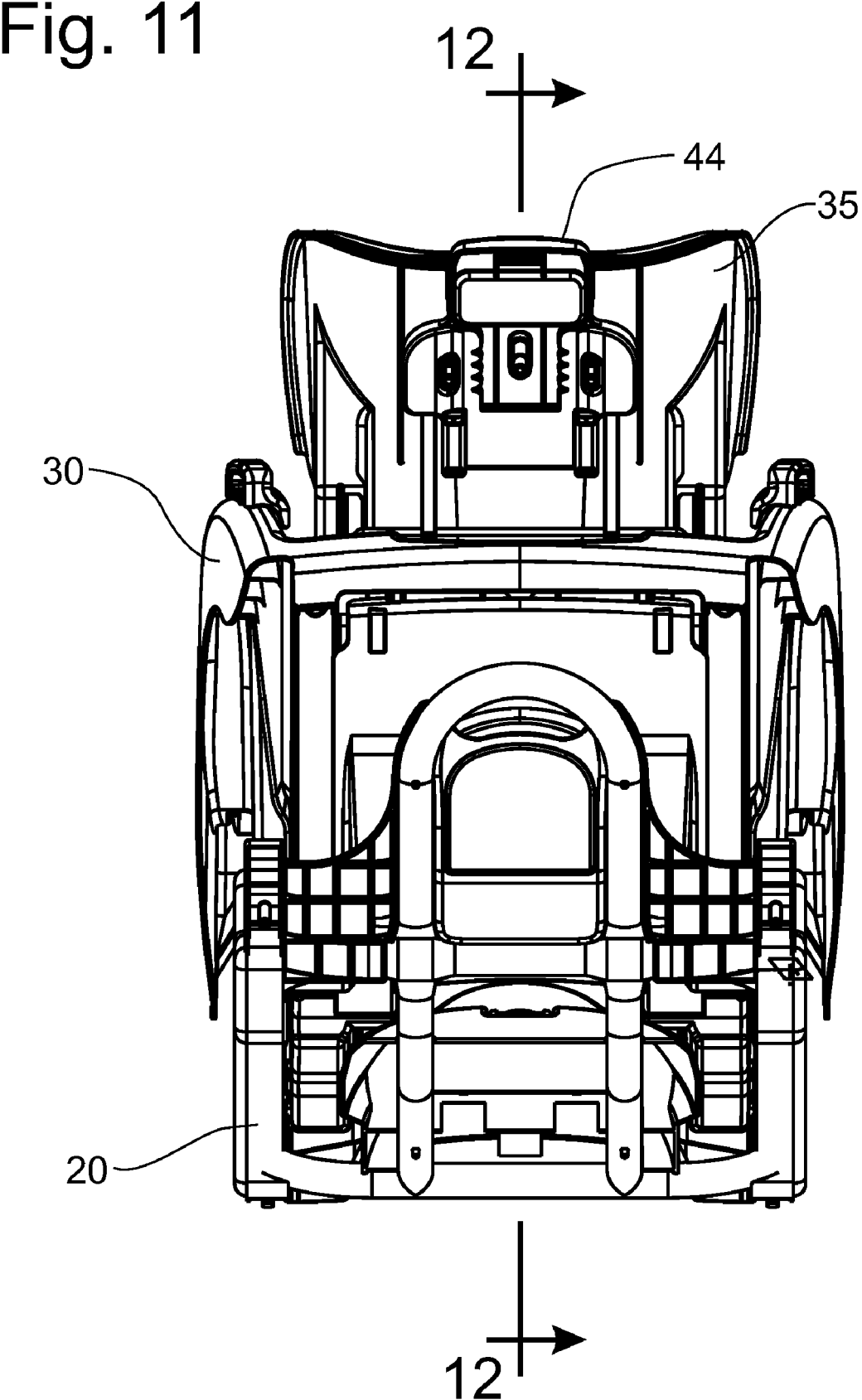
FIG. 11 is a rear elevational view of the car seat depicted in FIG. 9 with the seat member being moved into a reclined position, the head rest being located in the fully raised position.
Figure 12:
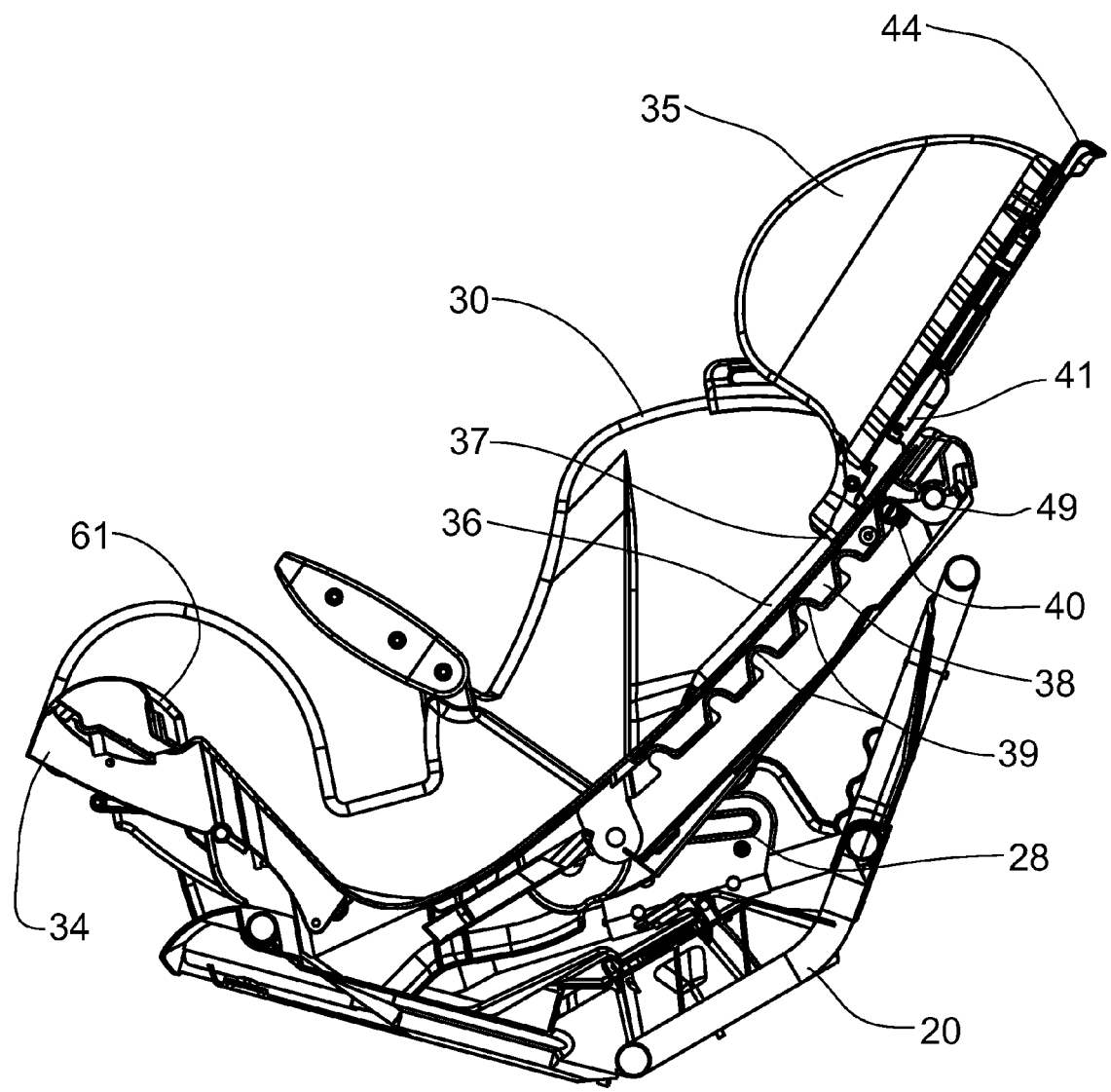
FIG. 12 is a cross-sectional view of the car seat corresponding to lines 12-12 of FIG. 11.
Figure 13:
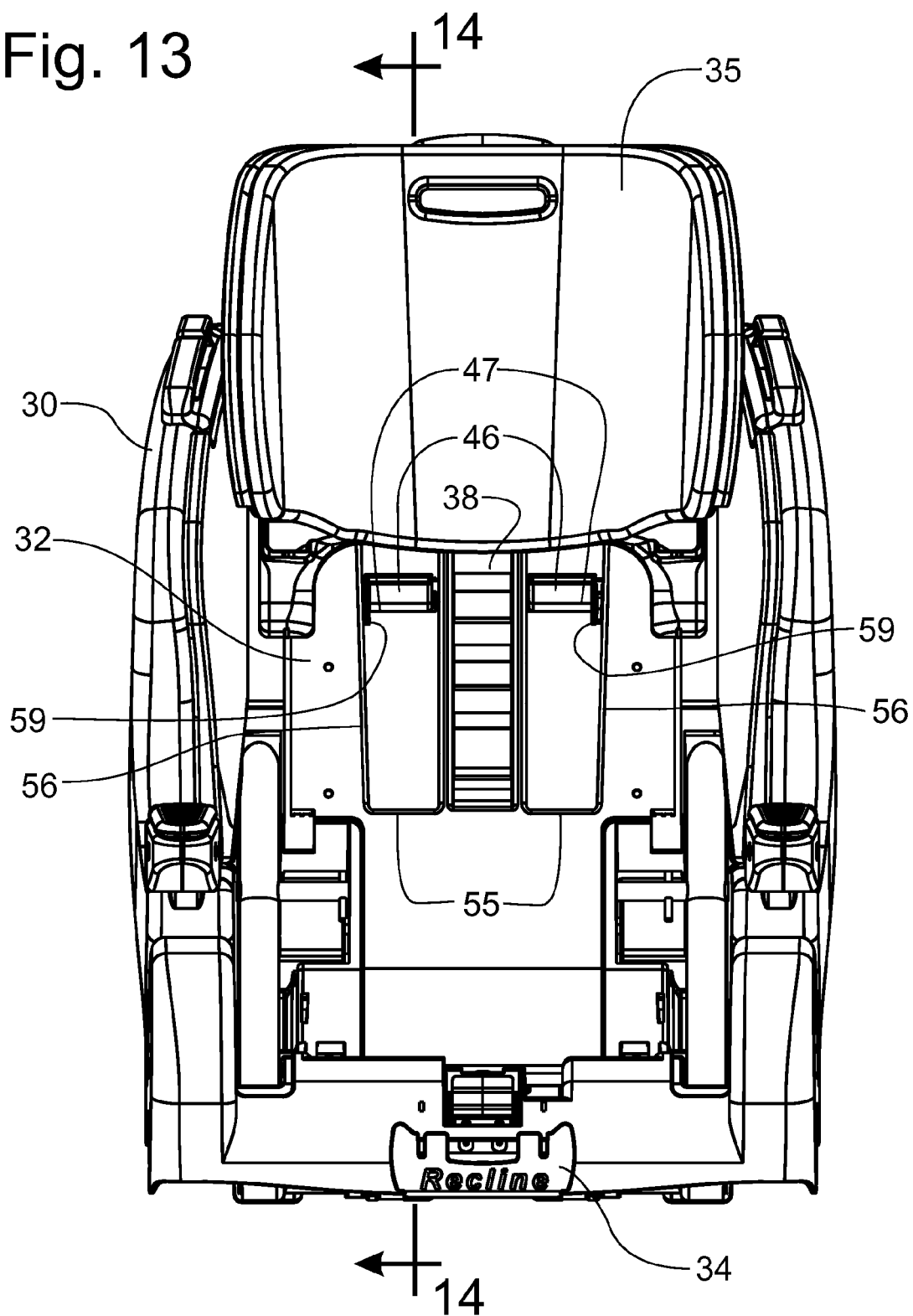
FIG. 13 is a front elevational view of the car seat in an upright orientation with the head rest moved into a mid-range position.
Figure 14:
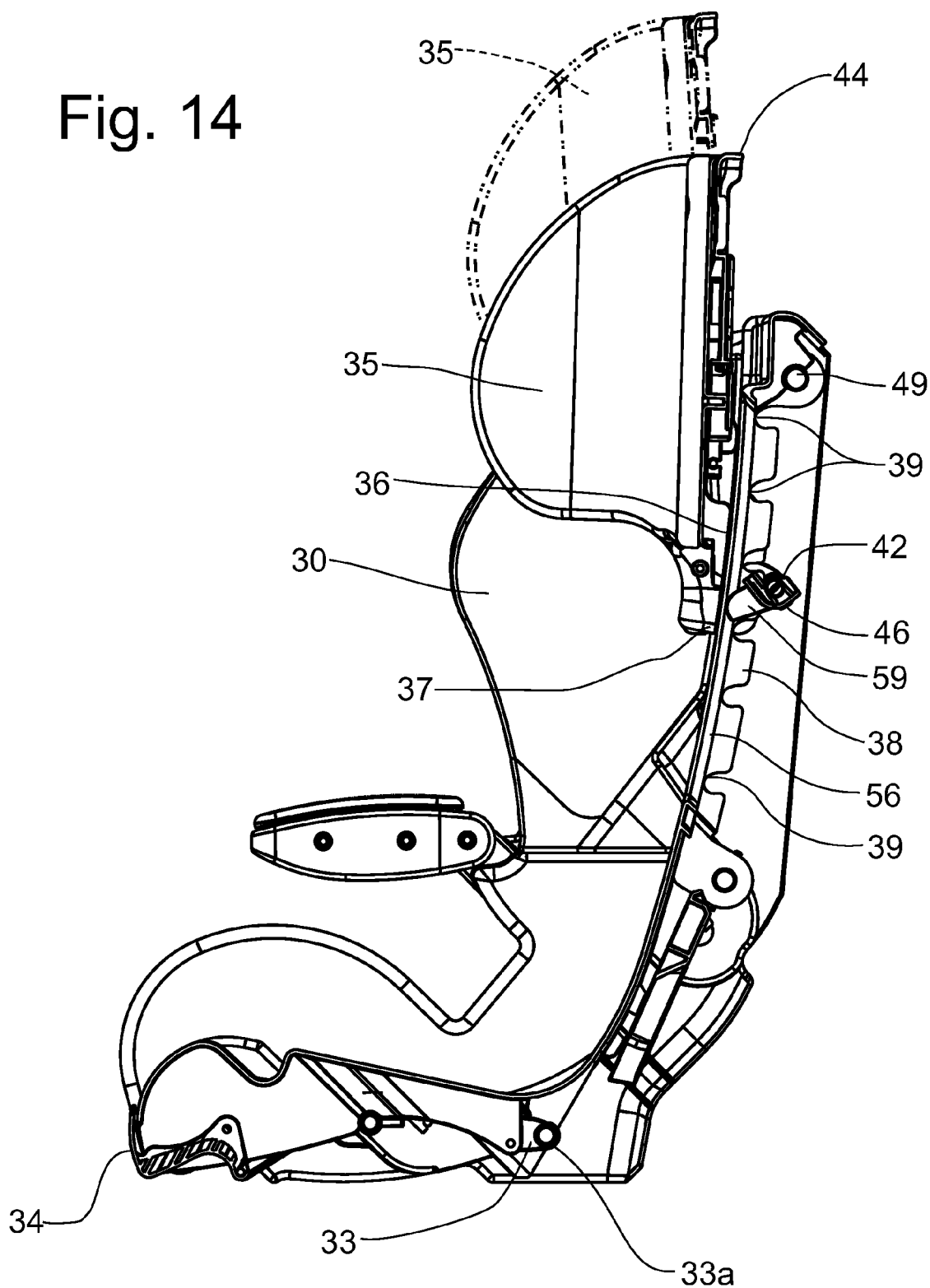
FIG. 14 is a cross-sectional view of the car seat corresponding to lines 14-14 of FIG. 13, the movement of the head rest from a mid-range raised position to a fully raised position being shown in phantom.
Figure 15:
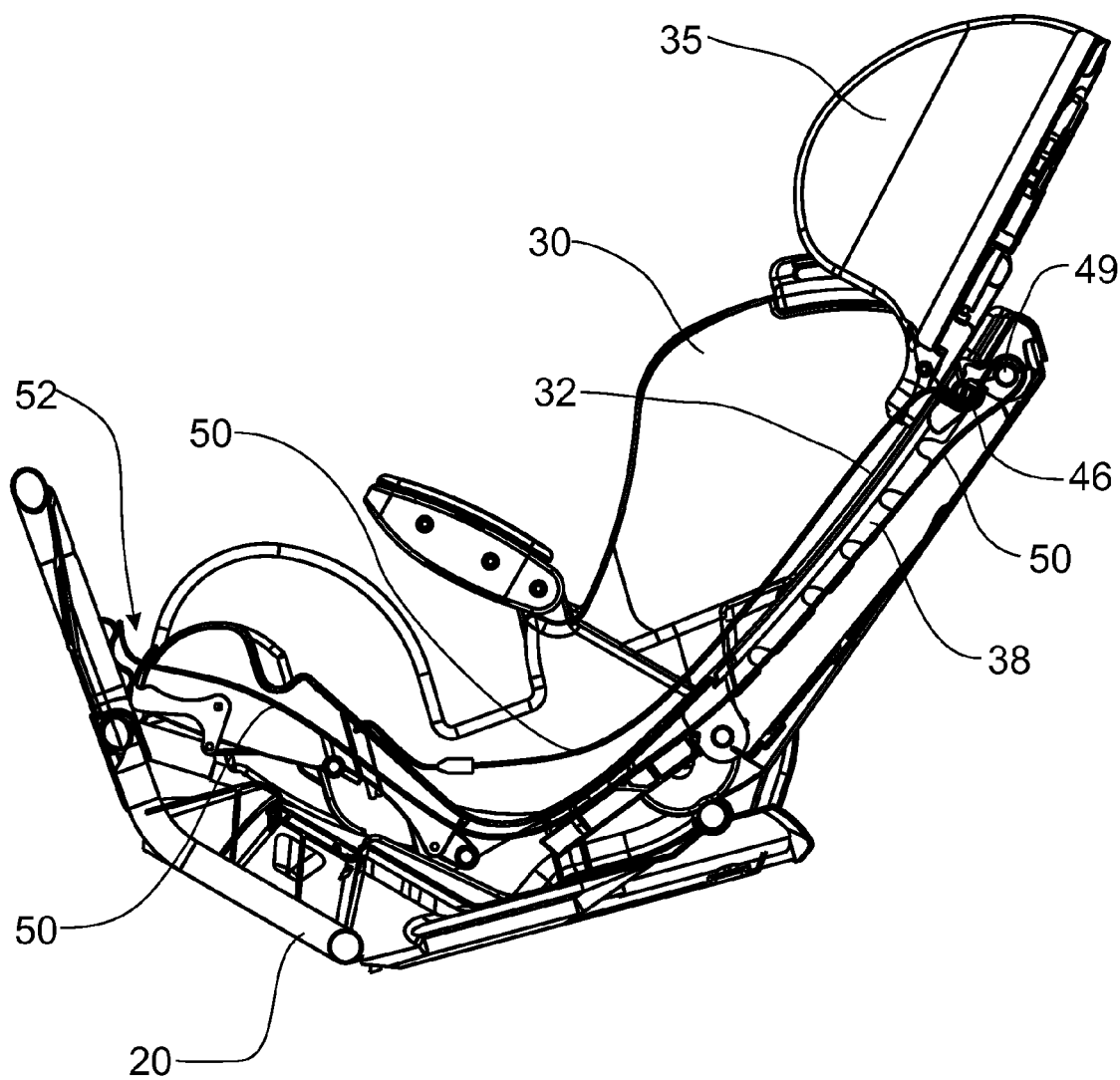
FIG. 15 is a cross-sectional view similar to that of FIG. 14, but showing the seat member moved into a rearwardly-facing orientation, the head rest being shown in the fully raised position, although a lowermost position of the head rest would be utilized when the seat member is rear-facing due to the small size of the child.
Figure 16:
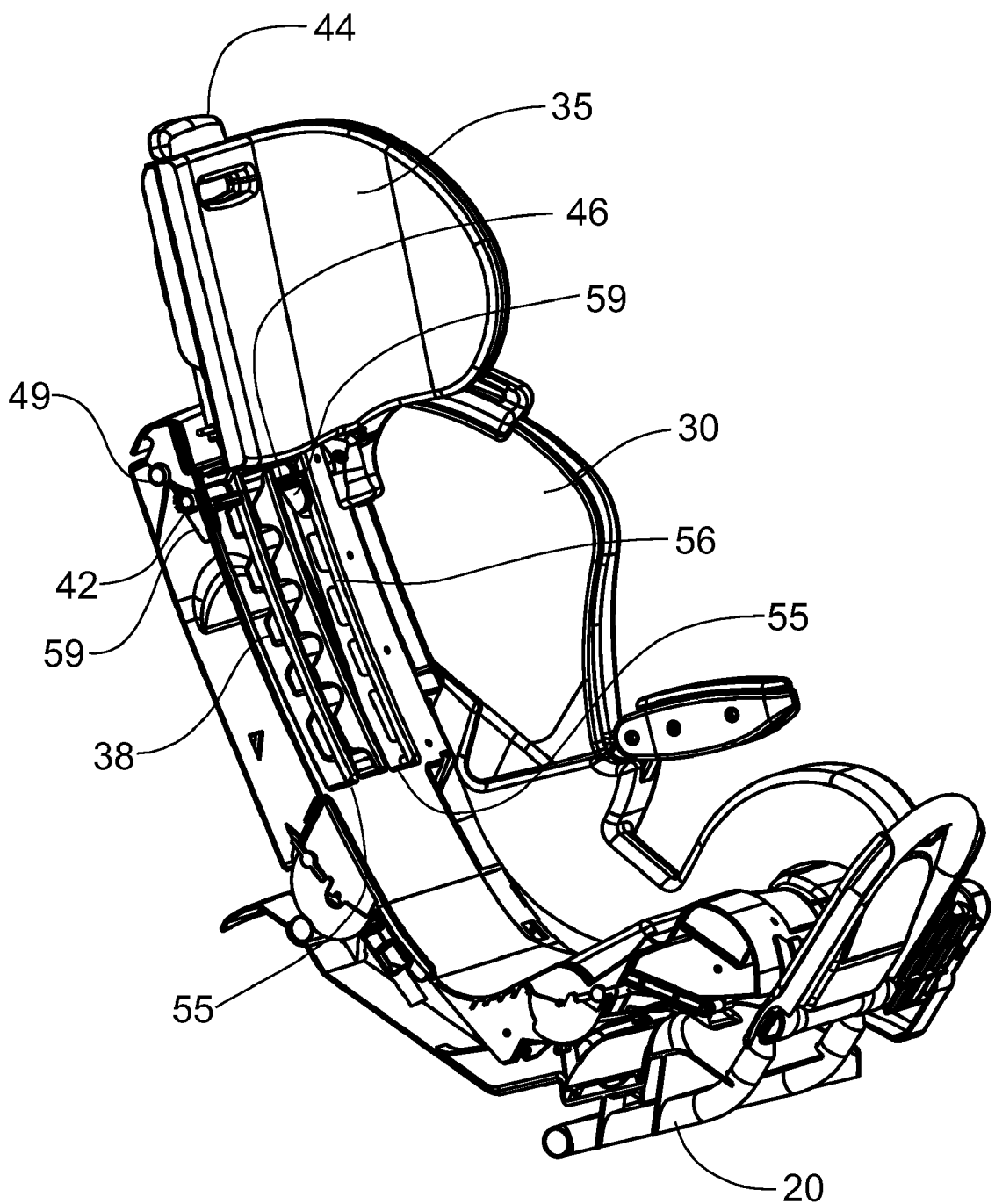
FIG. 16 is a cross-sectional view opposite of the view shown in FIG. 14, but depicted in a perspective orientation, with the seat member being re-configured on the base member to be in a rearwardly-facing configuration and the head rest being placed in the fully raised position.
Figure 17:
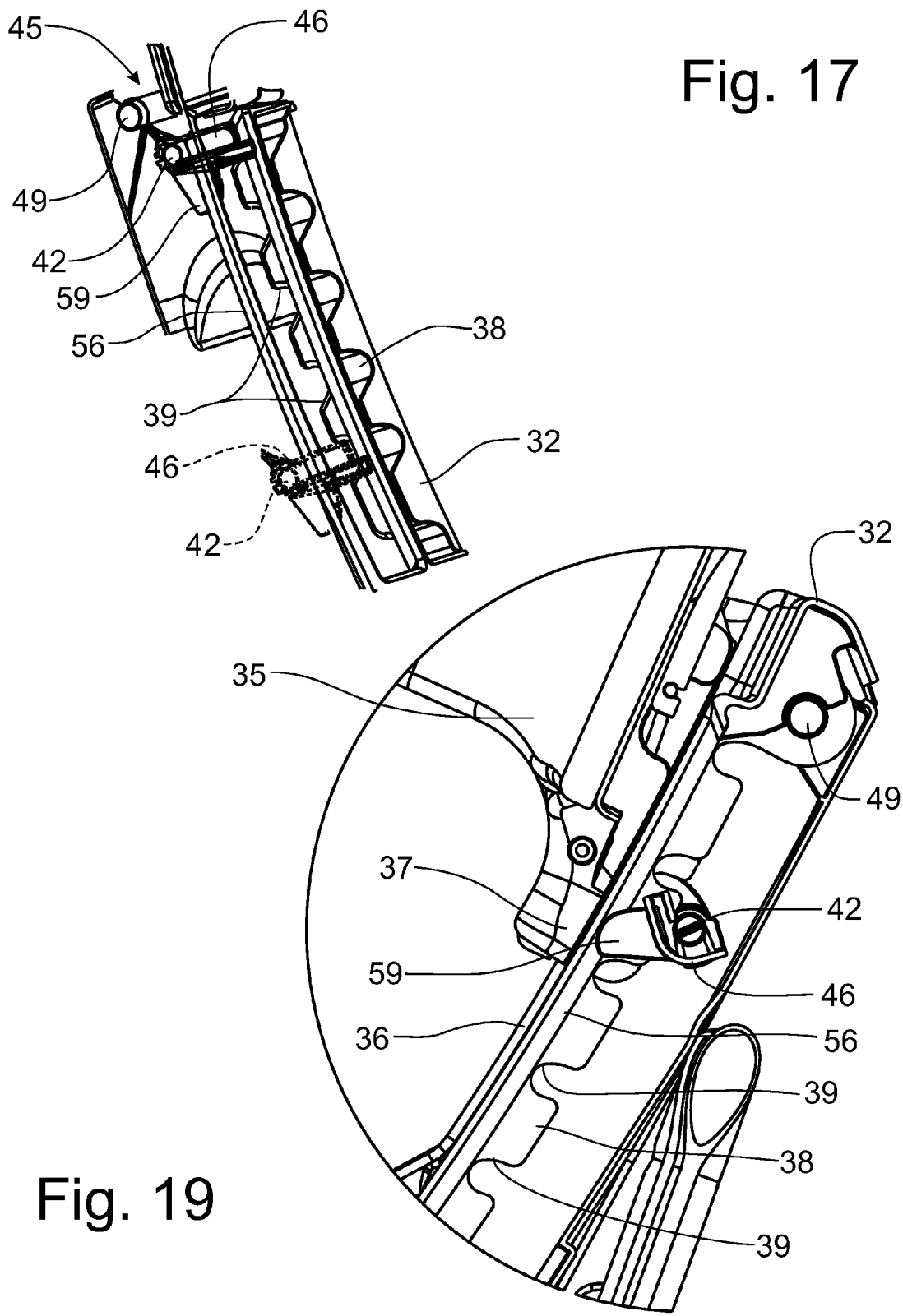
FIG. 17 is an enlarged partial perspective view of the harness control apparatus as shown in FIG. 16, the movement of the harness guide member to the lowermost position being shown in phantom.
Figure 18:
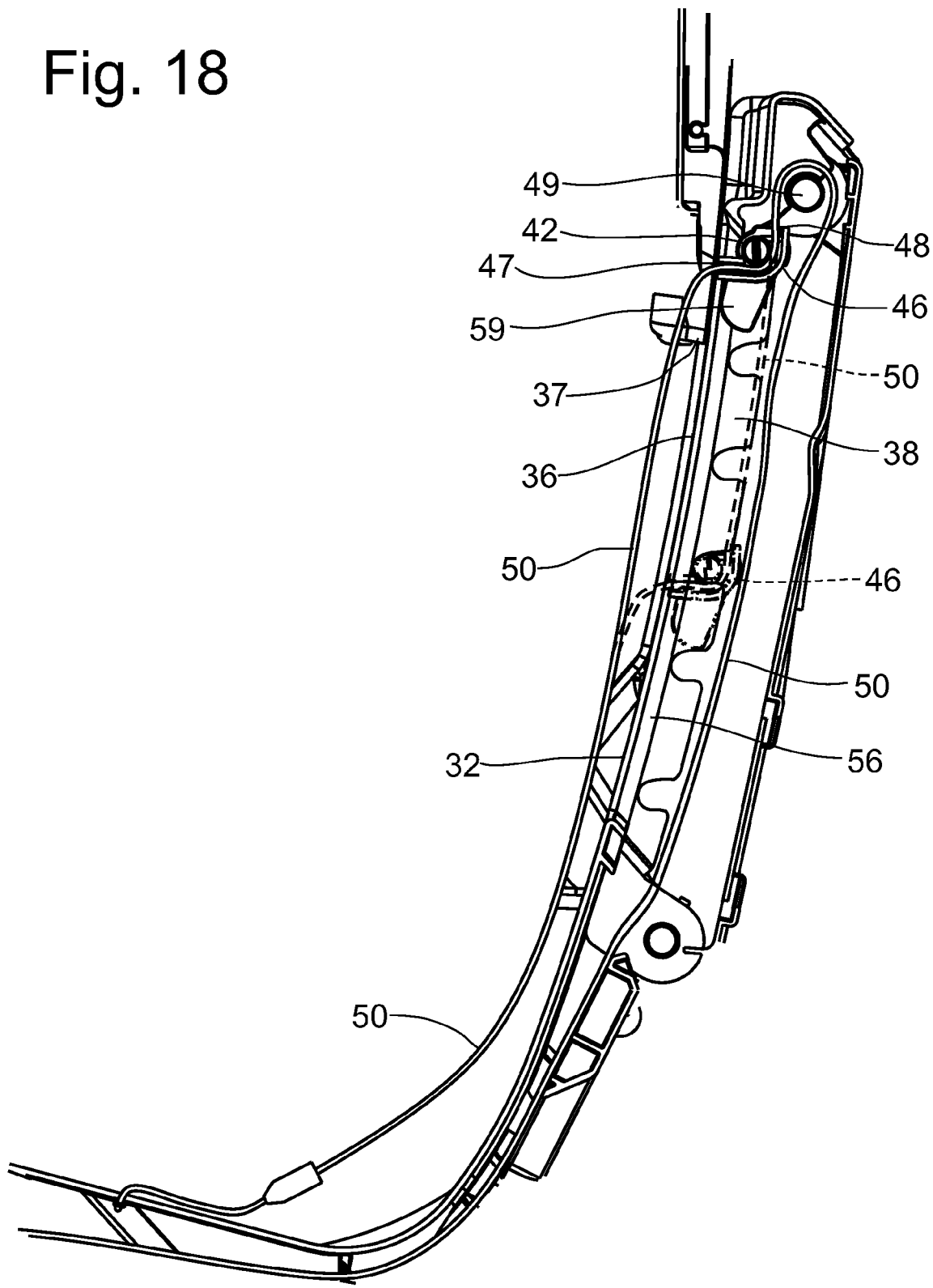
FIG. 18 is an enlarged partial cross-sectional view of the seat member showing the harness belt path in the fully raised position as depicted in FIG. 16, the belt path corresponding to a relocation of the head rest to a mid-range position being shown in phantom.

The seat member 30 can be mounted onto the base member 20 in either a forward-facing orientation, such as is depicted in FIG. 4, or in a rearwardly-facing orientation, as is shown in FIGS. 15 and 16. The seat member 30 includes two pairs of latch pins 65 that are retractable in conjunction with the movement of the actuator handle 61 located in a forward part of the seat portion of the seat member 30. The movement of the actuator handle 61 is operable to cause a retraction of the latch pins 65 into the body of the seat member 30 until the seat member 30 is properly positioned onto the base member 20, whereupon the latch pins 65 are allowed to extend into the respective lower and upper recline slots 27, 28 to trap the seat member 30 on the base member 20. The positioning of the seat member 30 onto the base member 29 places the recline latch apparatus 33 into engagement with the recline rack 25 to prevent the latch pins 65 from sliding along the corresponding recline control slots 27, 28.

As seen in FIGS. 9-18, the seat member 30 includes a head rest 35 formed with slide members 37 that are generally vertically movable along a curved, concave path along the seat back 32 defined by concave curved tracks 36 formed on the back side of the seat back 32. Thus, as the head rest 35 is raised, the top portion of the head rest 35 moves inwardly toward the front of the seat member 30 providing a more upright back angle for the child as the child gets older and larger, requiring the upward movement of the head rest 35. The back portion of the seat member 30 has a control rack 38 formed into the curved track 36 and defining a plurality of vertically spaced notches 39 corresponding to different vertical positions for the head rest 35. The head rest 35 is connected to a lock mechanism 40 that engages the control rack 38. The lock mechanism 40 includes a lock bar 42 that rests in a selected notch 39 and is spring-loaded into engagement with the control rack 38. An actuation handle 44 is operatively connected to the pivot lever 43 on the lock mechanism 40 to force the lock bar 42 out of engagement with the control rack 38 to enable the head rest 35 to be moved vertically.

The lock mechanism 40 includes a pair of laterally spaced guide members 46 that define openings 47 that are oriented generally horizontally. The guide member 46 controls the position of the harness belt 50 relative to the shoulders of the child seated in the car seat 10 and raises and lowers in response to the position of the lock mechanism 40 and the attached head rest 35. Thus, when the head rest 35 is raised along the curved track 36, the guide members 46 move accordingly and position the harness belt 50 to pass from behind the curved seat back 32 through openings in the seat back 32 to the front of the seat back 32 for engagement with the child seated on the car seat 10.

The harness support apparatus 45 includes a fixed guide bar 49 mounted within the seat back 32 above the control rack 38. The harness belt 50 is trapped in a conventional length adjustment device 52 at the lower front portion of the seat member 30. From the length adjustment device 52, the harness belt 50 passes underneath the seat portion of the seat member 30 and through the structure of the seat member 30 behind the seat back 32 and the control rack 38 to the fixed guide bar 49. The harness belt 50 loops over the fixed guide bar 49 and passes downwardly to the lock mechanism 40 behind the lock bar 42 and then through the guide members 46 to exit through the outlet openings 47 to extend to the front of the seat back 32. The harness belt 50 is secured to the seat member 30 in a conventional manner. The use of the fixed guide bar 49 secured to the frame of the seat back 32 provides an opportunity to use a metal rod that will increase the resistance of the harness belt 50 to pull out of the car seat 10 during crash events. Furthermore, the amount of bending of the fixed guide rod 49 can be used to evaluate the stresses incurred during a crash event and provide a positive indicator that a car seat 10 has been subjected to a crash event.

Referring now to FIGS. 17-21, the guide members 46 define a curved path through which the harness belt 50 is fed to change the direction of the harness belt 50 from a generally vertical inlet 48 to a generally horizontal outlet opening 47 wrapped around the lock bar 42. The guide members 46 are aligned with the generally vertical openings 55 formed in the seat back 32 so that the harness belts 50 can move vertically with the head rest 35 without impediment from the seat back 32. Soft goods (not shown), i.e. the padded covering over the seating surface of the seat member 30, are formed with corresponding openings therein to allow the passage of the harness belts 50 from the outlet openings 47 over the shoulders of the child seated in the seat member 30. The lock bar 42 extends through the guide members 46 to opposing sides thereof for pivotal actuation by the actuation handle 44 at the top of the head rest. The lock bar 42 extending between the guide members 46 is engagable with the control rack 38 to lock the head rest 35 the desired position.

Figure 21:
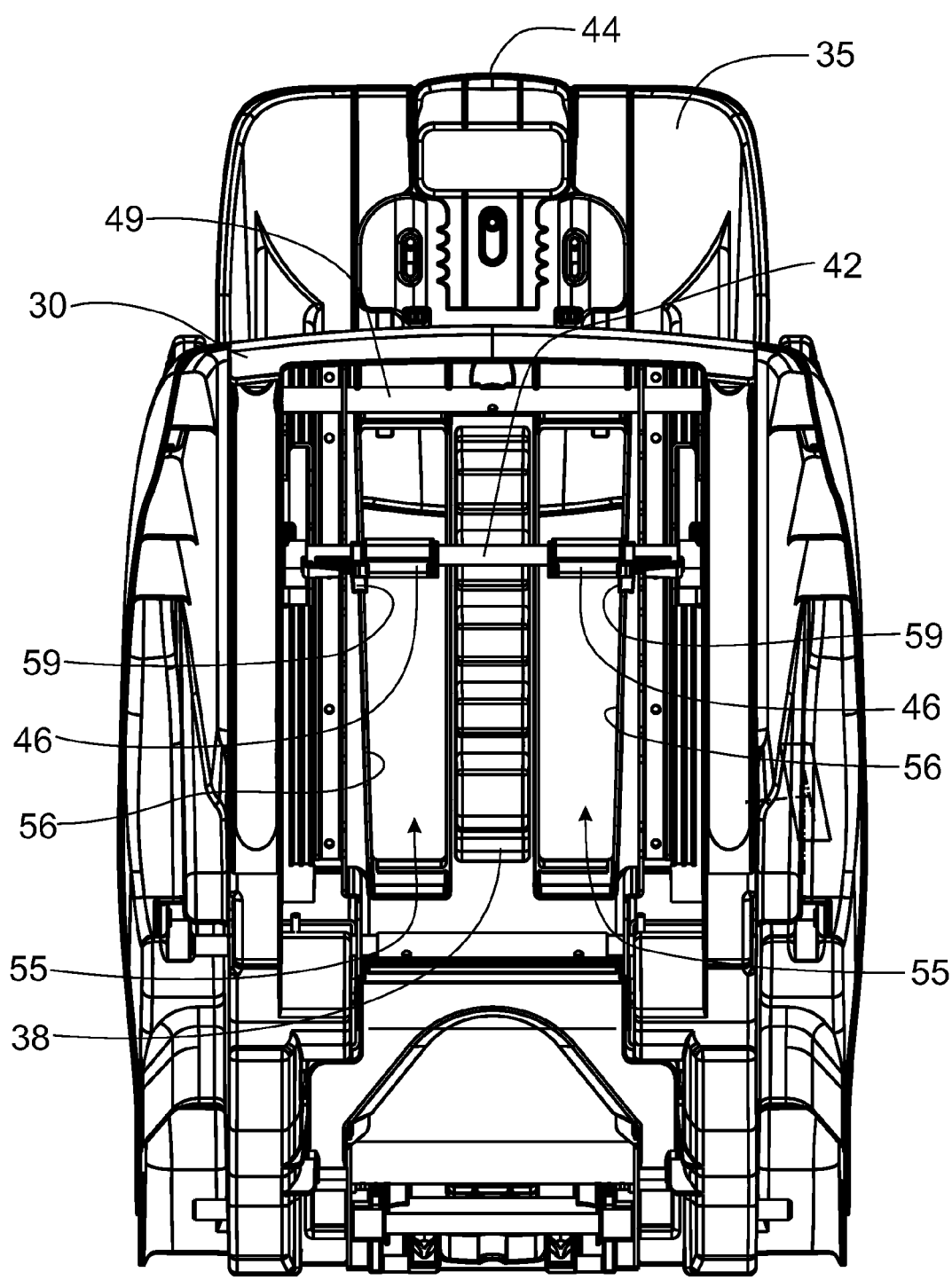
FIG. 21 is a rear elevational view of the seat member similar to that of FIG. 20, but with the head rest being lowered to a mid-range position.

To adjust the position of the head rest 35, the actuation handle 44 is retracted into the head rest 35, as is depicted in FIG. 21 to push the pivot lever 43 through a linkage 41 to release the lock bar 42 from the notch 39 and allow the lock bar 42 to move along the control rack 38 until the desired position is attained for the head rest 35. As the guide members 46 are moved vertically with the head rest 35, the guide members 46 simply slide along the harness belt 50 as the guide members 46 move to the selected vertical position. When the lock bar 42 is re-engaged with a selected notch 39 in the control rack 38, the overall length of the harness belt 50 did not substantially change due to the looping of the harness belt 50 over the fixed guide bar 49, even though the position at which the harness belt 50 transitions from behind the seat back 32 to in front of the seat back 32 changes in response to the positioning of the head rest 35. The head rest 35 is locked into the newly selected position by retracting the actuation handle 44 into the head rest 35, as depicted in FIG. 21, to drive the lock bar 42 into a corresponding notch 39 in the control rack 38.

Figure 20:
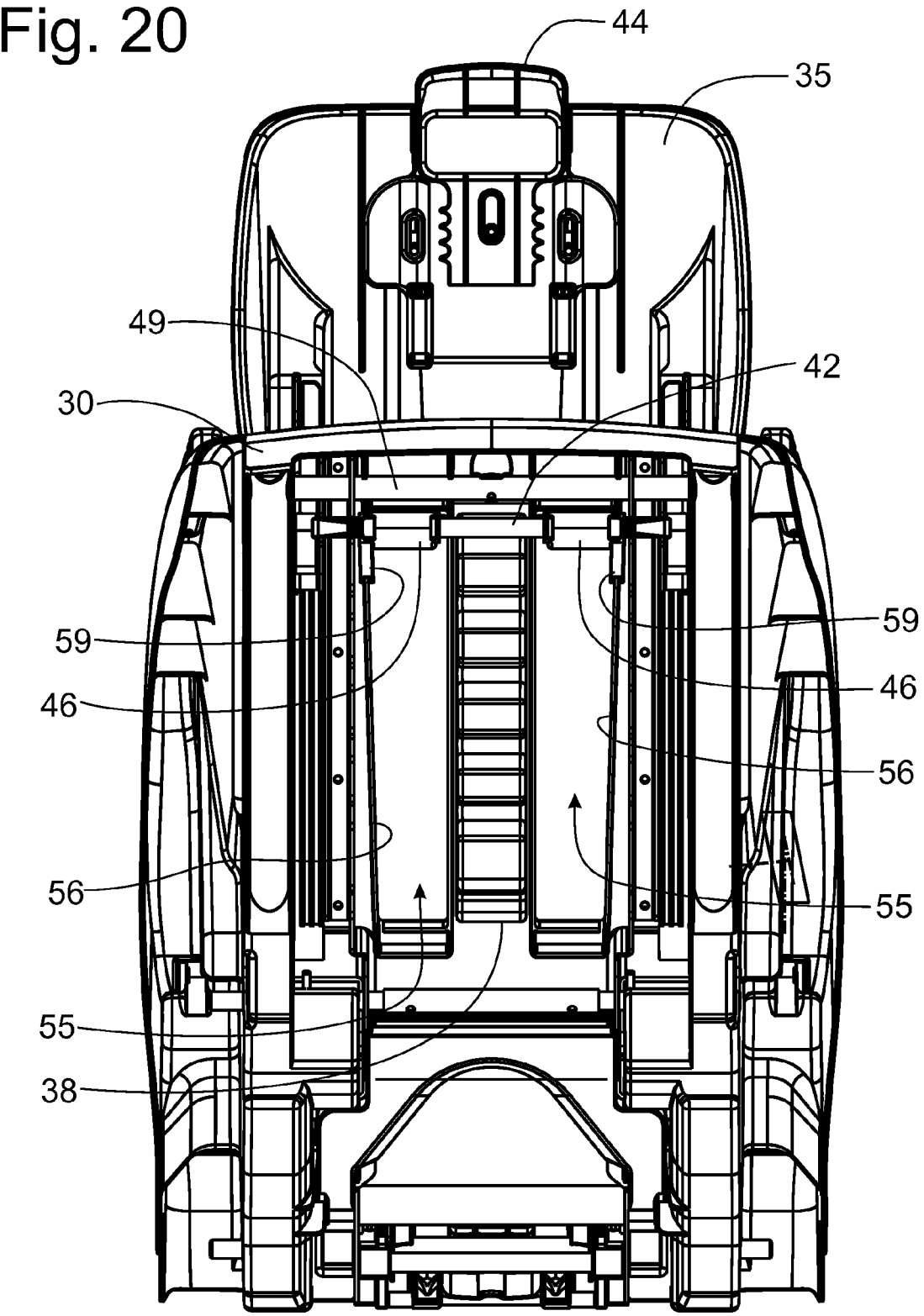
FIG. 20 is rear elevational view of the seat member with the protective panel removed therefrom to show the lock mechanism for the head rest, the head rest being depicted in the fully raised position.

As is best seen in FIGS. 20 and 21, the openings 55 are somewhat trapezoidal in shape, wider at the top and narrower at the bottom, so that the guide members 46 can move laterally along the lock bar 42 to move outwardly as the head rest is raised to accommodate the wider body of a growing child. The outside edge of each opening 55 is formed with a cam flange 56 that projects generally perpendicularly to the seat back 32 and is engagable with a follower 59 mounted on the guide member 46 to force the guide member 46 laterally on the lock bar 32 in response to the selected vertical position of the head rest 35.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A car seat for transporting a child in an automobile, comprising:
    a seat member including a seat back having a front surface and a rear surface, said seat back including at least one track member and a control rack formed with a plurality of generally vertically spaced notches located on said rear surface;
    a head rest extending above said seat member and including at least one slide member in register with the corresponding said track member to be engaged therewith for selective movement of said head rest relative to said seat back between a plurality of generally vertical positions;
    a locking mechanism pivotally mounted on said head rest to engage said control rack to secure said head rest into a selected said vertical position, said locking mechanism including a lock bar that can be pivoted into engagement with a selected one of said notches to fix said head rest in the corresponding selected vertical position; and
    said seat back being formed with a pair of laterally spaced openings therethrough, said locking mechanism including a pair of guide members mounted on said lock bar in communication with said openings and positioned along said rear surface of said seat back; and
    a fixed guide bar mounted in said seat back above said openings, said harness belt extending from an anchor point and being wrapped over said fixed guide bar and extending therefrom to the corresponding said guide member to direct said harness belt from a position behind said seat back through a generally horizontally oriented outlet in said guide member to pass through said openings in said seat back to a position in front of said seat back for support of the child positioned in said car seat, said harness being positionally adjustable in conjunction with vertical movement of said lock bar with said head rest.

2. The car seat of claim 1 wherein each of said openings are formed with a cam flange along one vertical edge thereof, each said guide member including a follower engaged with the corresponding said cam flange.

3. The car seat of claim 2 wherein said openings are trapezoidal in shape with the corresponding said cam flange being oriented at an angle to a vertical alignment, said guide members being slidably mounted on said lock bar to move laterally in response to the selected vertical position of said head rest.

4. The car seat of claim 1 further comprising an actuation device mounted on said head rest and movable therewith, said actuation device being connected to said locking mechanism to cause said locking mechanism to pivotally move said lock bar out of engagement with said selected one of said notches in said control rack and permit movement of said head rest relative to said seat back.

5. The car seat of claim 1 wherein said at least one track member is curved forming a concave configuration relative to a position forwardly of said seat back.

6. The car seat of claim 5 wherein said at least one track member comprises a pair of laterally spaced track members engaged by a corresponding pair of slide members, said control rack being located between said track members.

7. In a car seat having a seat back and a head rest supported on said seat back for generally vertical movement relative to said seat back, the improvement comprising:
    said seat back including at least one curved track member forming a concave configuration relative to a position forwardly of said seat back, said seat back being formed with a pair of laterally spaced openings therethrough, each said opening being formed with a cam flange along one edge thereof that is oriented at an acute angle from a vertical orientation; and
    said head rest including at least one slide member in register with the corresponding said track member for selective vertical movement of said head rest relative to said seat back, the movement of said head rest upwardly relative to said seat back affecting a forward movement of a top portion of said head rest relative to said seat back;
    a fixed guide bar mounted in said seat back above said openings; and
    a pair of harness belts extending from an anchor point and being wrapped over said fixed guide bar and extending therefrom through respective said openings to direct said harness belts from a position behind said seat back to a position in front of said seat back for support of the child positioned in said car seat, each said harness belt being associated with a follower engaged with the corresponding said cam flange so that said harness belts will move laterally as said head rest is moved vertically.

8. The car seat of claim 7 wherein each said follower is mounted on a guide member engaged by a corresponding said harness belt to direct the corresponding said harness belt through the corresponding said opening in said seat back.

9. A car seat for transporting a child in an automobile and having a seat back on which a head rest is mounted for generally vertical movement relative to said seat back said seat back including harness belts positionable for support of the child within said car seat, comprising:
- said seat back being formed with a pair of laterally spaced openings therethrough;
- said head rest including a movable guide bar positioned in register with said openings and being vertically movable along said openings in response to a corresponding vertical movement of said head rest relative to said seat back, said movable guide bar member being operable to direct said harness belt through the openings in said seat back;
- a fixed guide bar mounted in said seat back above said openings; and
- said harness belts extending from an anchor point and being wrapped over said fixed guide bar and extending therefrom to said movable guide bar to be directed through said openings and extend forwardly of said seat back for engagement with the child in said car seat, such that the vertical movement of said movable guide bar redirects the positioning of the corresponding said harness belts.

10. The car seat of claim 9 wherein the engagement of said harness belts with said fixed and movable guide bars allows said harness belt to be moved vertically with said head rest without substantially changing an overall length of said harness belts.

11. The car seat of claim 10 wherein each said opening is trapezoidal in shape and formed with a cam flange along one vertical edge thereof oriented at an angle to a vertical alignment, each said guide member being slidably mounted on said movable guide bar and including a follower engaged with the corresponding said cam flange so that said guide members will move laterally in response to the vertical movement of said head rest relative to said seat back.

12. The car seat of claim 11 wherein said seat back is also formed with a control rack formed with a plurality of generally vertically spaced notches, said head rest including a locking mechanism operable to engage said control rack to secure said head rest into a selected said vertical position, said locking mechanism including said movable guide bar which is operable to engage a selected one of said notches to fix said head rest in the corresponding selected vertical position.

13. The car seat of claim 12 wherein said seat back includes a pair of laterally spaced curved track members forming a concave configuration relative to a position forwardly of said seat back, said head rest including a pair of corresponding slide members in register with the corresponding said track members to be engaged therewith for selective movement of said head rest between generally vertical positions, the movement of said head rest upwardly relative to said seat back affecting a forward movement of a top portion of said head rest relative to said seat back.

14. The car seat of claim 10 further comprising a pair of guide members mounted on said movable guide bar and being positioned in alignment with said openings to be vertically movable within said openings in response to the movement of said movable guide bar and said head rest, each said guide member being engaged with a corresponding one of said harness belts, each said guide member having an inlet oriented generally vertically and an outlet oriented generally horizontally to receive the corresponding said harness belt and direct said harness belt through the corresponding said opening in said seat back for support of the child positioned in said car seat.

15. A car seat for transporting a child in an automobile, comprising:
- a seat member including a seat back having a front surface and a rear surface, said seat back including a control rack formed with a plurality of generally vertically spaced notches located on said rear surface;
- a head rest movably mounted on said seat back;
- a locking mechanism movably mounted on said head rest to engage said control rack to secure said head rest into a one of a plurality of selected vertical positions, said locking mechanism including a lock bar that can be pivoted into engagement with a selected one of said notches to fix said head rest in the corresponding selected vertical position, said seat back being formed with a pair of laterally spaced, trapezoid-shaped openings therethrough, said locking mechanism including a pair of guide members slidably mounted on said lock bar and being aligned with said openings; and
- a fixed guide bar mounted in said seat back above said openings, each said harness belt extending from an anchor point and being wrapped over said fixed guide bar and extending therefrom to said guide members, each said guide member receiving a vertically oriented portion of the corresponding said harness belt behind said seat member to direct said harness belt in a generally horizontal direction through the corresponding said opening, said harness being positionally adjustable laterally and vertically within said openings in conjunction with vertical movement of said lock bar with said head rest.

16. The car seat of claim 15 further comprising a position control mechanism engagable with said guide members to affect lateral displacement of the guide members as the guide members are moved vertically for laterally moving said harness belts within said trapezoidal openings.

* * * * *